United States Patent
Yoon

(10) Patent No.: US 10,348,824 B2
(45) Date of Patent: Jul. 9, 2019

(54) METHOD AND APPARATUS FOR SYNCHRONIZING STATE INFORMATION OF A PLURALITY OF TERMINALS

(71) Applicant: SAMSUNG SDS CO., LTD., Seoul (KR)

(72) Inventor: Hee Tae Yoon, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 128 days.

(21) Appl. No.: 15/499,360

(22) Filed: Apr. 27, 2017

(65) Prior Publication Data

US 2017/0331888 A1    Nov. 16, 2017

(30) Foreign Application Priority Data

May 10, 2016 (KR) .................. 10-2016-0057004

(51) Int. Cl.
*H04L 12/16* (2006.01)
*H04L 29/08* (2006.01)
*H04L 29/06* (2006.01)

(52) U.S. Cl.
CPC ........ *H04L 67/1095* (2013.01); *H04L 65/403* (2013.01); *H04L 67/24* (2013.01)

(58) Field of Classification Search
CPC .... H04L 65/403; H04L 67/1095; H04L 67/24
See application file for complete search history.

(56) References Cited

U.S. PATENT DOCUMENTS

| 8,090,821 B2 | 1/2012 | Holt et al. | |
| 2008/0244026 A1* | 10/2008 | Holt | H04L 51/04 709/206 |
| 2013/0132854 A1* | 5/2013 | Raleigh | G06F 3/0482 715/738 |

* cited by examiner

*Primary Examiner* — Minh Trang T Nguyen
(74) *Attorney, Agent, or Firm* — Sughrue Mion, PLLC

(57) ABSTRACT

Provided are a method of synchronizing state information, the method comprises receiving first state information from a first terminal among a plurality of terminals, setting first synchronization identification information in the received first state information, transmitting the first state information and the first synchronization identification information set in the first state information to the terminals, receiving second state information and second synchronization identification information set in the second state information from a second terminal among the terminals, determining whether the received second state information is a synchronization target by judging whether the received first synchronization identification information matches the received second synchronization identification information and not transmitting the received second state information to the terminals when determining that the received second state information is not the synchronization target.

15 Claims, 10 Drawing Sheets

| RESERVATION ORDER | TERMINAL | STATE RESERVATION INFORMATION | CONTROL COMMAND | TIME | REMARKS |
|---|---|---|---|---|---|
| 1 | FIRST TERMINAL | REQUEST TO TURN ON MICROPHONE | TURN OFF MICROPHONE OF SECOND TERMINAL<br>TURN OFF MICROPHONE OF THIRD TERMINAL<br>TURN OFF MICROPHONE OF THIRD TERMINAL | 10 MINUTES | 1 RESERVATIONS |
| 2 | FIRST TERMINAL | REQUEST TO TRANSMIT HANDWRITTEN CONTENTS | CONTROL MONITOR OF SECOND TERMINAL<br>CONTROL MONITOR OF THIRD TERMINAL<br>CONTROL MONITOR OF FOURTH TERMINAL | 10 MINUTES | 2 RESERVATIONS |
| 3 | THIRD TERMINAL | REQUEST TO TRANSMIT IMAGE | CONTROL MONITORS OF ALL TERMINALS<br>TURN OFF MICROPHONE OF FIRST TERMINAL<br>TURN OFF MICROPHONE OF SECOND TERMINAL<br>TURN OFF MICROPHONE OF FOURTH TERMINAL | 5 MINUTES | VIP |
| 4 | SECOND TERMINAL | REQUEST TO TURN OFF MICROPHONE OF FIRST TERMINAL | TURN OFF MICROPHONE OF FIRST TERMINAL<br>TURN ON MICROPHONE OF SECOND TERMINAL | 10 MINUTES | 2 RESERVATIONS |
| 5 | FOURTH TERMINAL | REQUEST TO TURN ON MICROPHONE | TURN ON MICROPHONE OF FIRST TERMINAL<br>TURN OFF MICROPHONE OF SECOND TERMINAL<br>TURN OFF MICROPHONE OF THIRD TERMINAL | 10 MINUTES | 3 RESERVATIONS |
| ... | ... | ... | ... | ... | ... |

| RESERVATION ORDER | TERMINAL | STATE RESERVATION INFORMATION | CONTROL COMMAND | TIME | REMARKS |
|---|---|---|---|---|---|
| 1 | FIRST TERMINAL | REQUEST TO TURN ON MICROPHONE | TURN OFF MICROPHONE OF SECOND TERMINAL TURN OFF MICROPOHNE OF THIRD TERMINAL | 10 MINUTES | 1 RESERVATIONS |
| 1 | FOURTH TERMINAL | REQUEST TO TURN ON MICROPHONE | TURN OFF MICROPHONE OF SECOND TERMINAL TURN OFF MICROPHONE OF THIRD TERMINAL | 10 MINUTES | STATE MATCHING |
| 2 | THIRD TERMINAL | REQUEST TO TRANSMIT IMAGE | CONTROL MONITORS OF ALL TERMINALS TURN OFF MICROPHONE OF FIRST TERMINAL TURN OFF MICROPHONE OF SECOND TERMINAL TURN OFF MICROPHONE OF FOURTH TERMINAL | 5 MINUTES | VIP |
| 3 | SECOND TERMINAL | REQUEST TO TURN OFF MICROPHONE OF FIRST TERMINAL | TURN OFF MICROPHONE OF FIRST TERMINAL TURN ON MICROPHONE OF SECOND TERMINAL | 10 MINUTES | 2 RESERVATIONS |
| ... | ... | ... | ... | ... | ... |

METHOD AND APPARATUS FOR SYNCHRONIZING STATE INFORMATION OF A PLURALITY OF TERMINALS

This application claims the benefit of Korean Patent Application No. 10-2016-0057004, filed on May 10, 2016, in the Korean Intellectual Property Office, the disclosure of which is incorporated herein by reference in its entirety.

BACKGROUND

1. Field

The present inventive concept relates to a method and apparatus for synchronizing state information of a plurality of terminals, and more particularly, to a method and apparatus for synchronizing state information exchanged between a plurality of terminals that are using a real-time conference service.

2. Description of the Related Art

With the development of communication technology, a real-time conference service among a plurality of participants located in different spaces is provided.

In such a real-time conference environment, the presence of each participant is managed in such a manner that each terminal transmits its state information to a server and the server transmits the state information of the terminal to other participants' terminals. In particular, each terminal receiving the state information synchronizes other participants' state information based on the received state information. Accordingly, all terminals can have the same presence information.

When a large number of participants participate in a real-time conference, state information that a server providing a real-time conference service should transmit to each terminal increases. Due to this increase in the state information, each terminal end has to select synchronization target information in the process of synchronizing state information of other participants. Nevertheless, there is no method of selecting synchronization target state information when state information is changed again between the time when state information of a specific participant is changed and the time when other participants' terminals are synchronized with the changed state information of the specific participant.

Also, there is no method of controlling and synchronizing the state information of the terminals of the participants during the real-time conference in order for a smooth conference process.

SUMMARY

Aspects of the inventive concept provide a method and apparatus for determining whether state information is a synchronization target based on state information exchanged between a plurality of terminals.

Specifically, aspects concept provide a method and apparatus for setting synchronization identification information indicating whether state information is a synchronization target in the state information and determining whether to transmit the state information based on the set synchronization identification information.

Aspects of the inventive concept also provide a method and apparatus for controlling terminals of participants through synchronization according to state information.

Aspects of the inventive concept also provide a method and apparatus for providing a real-time conference service by generating a synchronization schedule based on state information and performing synchronization according to the synchronization schedule.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of synchronizing state information, the method comprises receiving first state information from a first terminal among a plurality of terminals, setting first synchronization identification information in the received first state information, transmitting the first state information and the first synchronization identification information set in the first state information to the terminals, receiving second state information and second synchronization identification information set in the second state information from a second terminal among the terminals, determining whether the received second state information is a synchronization target by judging whether the received first synchronization identification information matches the received second synchronization identification information and not transmitting the received second state information to the terminals when determining that the received second state information is not the synchronization target.

According to another aspect of the inventive concept, there is provided an apparatus for synchronizing state information, the apparatus comprises, one or more processors, a network interface which communicates with a plurality of terminals, a memory which loads a computer program to be executed by the processors and a storage which stores the computer program, wherein the computer program comprises, an operation of receiving first state information from a first terminal among a plurality of terminals, an operation of setting first synchronization identification information in the received first state information, an operation of transmitting the first state information and the first synchronization identification information set in the first state information to the terminals, an operation of receiving second state information and second synchronization identification information set in the second state information from a second terminal among the terminals, an operation of determining whether the received second state information is a synchronization target by judging whether the received first synchronization identification information matches the received second synchronization identification information and an operation of not transmitting the received second state information to terminals when determining that the received second state information is not the synchronization target.

According to another aspect of the inventive concept, there is provided a method of synchronizing state information by a terminal comprising one or more input devices and one or more output devices, the method comprises, transmitting first state information to an apparatus for synchronizing state information, receiving the first state information and first synchronization identification information set in the first state information from the state information synchronization apparatus, controlling at least one of the input devices and the output devices based on the first state information, transmitting second state information to the state information synchronization apparatus together with the first synchronization identification information, receiving the second state information and second synchronization identification information set in the second state information from the state information synchronization apparatus and controlling at least one of the input devices and the output devices based on the second state information.

BRIEF DESCRIPTION OF THE DRAWINGS

These and/or other aspects will become apparent and more readily appreciated from the following description of the embodiments, taken in conjunction with the accompanying drawings in which:

FIG. 7 illustrates a reservation order list which is referred to in some embodiments;

FIG. 8 illustrates a modified reservation order list which is referred to in some embodiments;

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

As used herein, the term "state information" refers to information indicating various states of a participant terminal in a real-time conference. For example, the state information may include presence information indicating whether a terminal is attending a conference or is in an away state according to a participant's input.

According to an embodiment, the state information may also include information about a specific state requested by a participant terminal to an administrator in a real-time conference environment. For example, the state information may be information indicating a specific participant's floor request state. In this case, the state information may be information for controlling the functions of a terminal of a participant and/or terminals of other participants at the request of the terminal of the participant in a real-time conference.

Figure 1:
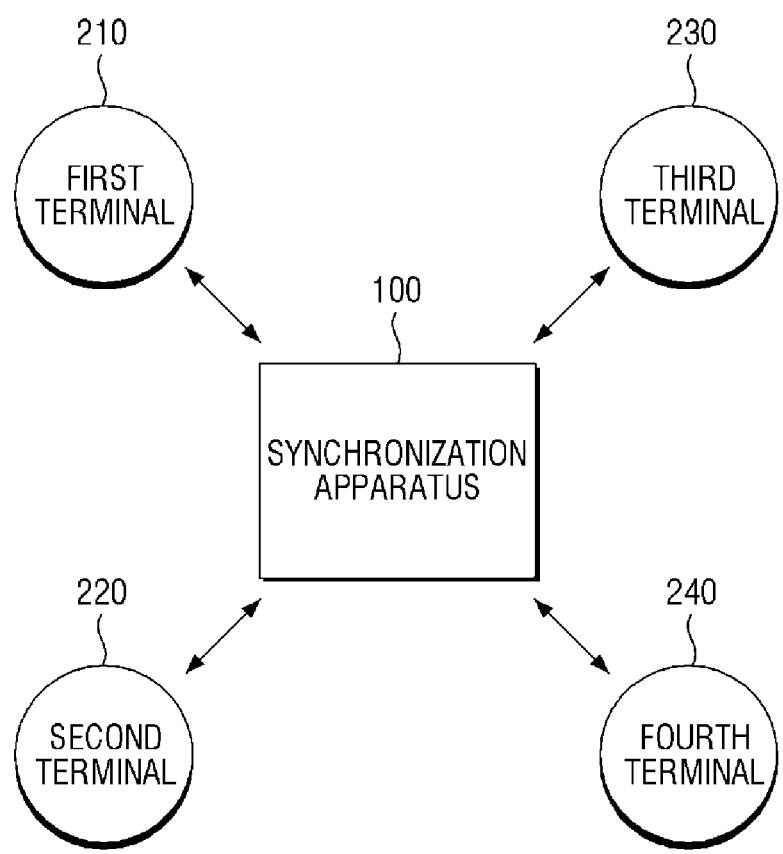
FIG. 1 illustrates the configuration of a system for synchronizing state information according to an embodiment.

FIG. 1 illustrates the configuration of a system for synchronizing state information according to an embodiment.

Referring to FIG. 1, the state information synchronization system may include an apparatus 100 for synchronizing state information and a plurality of terminals. The terminals may be provided with a real-time conference service. In this case, the state information synchronization apparatus 100 may be a server that provides a real-time conference. In FIG. 1, a first terminal 210, a second terminal 220, a third terminal 230, and a fourth terminal 240 are illustrated as an example of the terminals. The number of terminals illustrated is merely an example, and the state information synchronization system can be configured regardless of the number of terminals illustrated. That is, when a session for a real-time conference is created among a plurality of terminals, the terminals belonging to the session group may be included in the state information synchronization system.

The state information synchronization apparatus 100 may be a computing device capable of communicating with the terminals in the state information synchronization system. The state information synchronization apparatus 100 may receive various information exchanged between the terminals provided with the real-time conference service and determine a synchronization target based on the received information. In addition, the state information synchronization apparatus 100 may transmit state information, which is a synchronization target, to at least one of the terminals in the state information synchronization system. Further, the state information synchronization apparatus 100 may control a terminal in the state information synchronization system or a component of the terminal based on the state information.

Each terminal in the state information synchronization system of FIG. 1 is a computing device provided with the real-time conference service and capable of communicating with other terminals and the state information synchronization apparatus 100. The terminal may transmit state information, which is a synchronization target, and contents to the state information synchronization apparatus 100 and receive state information, which is a synchronization target, and a control command from the state information synchronization apparatus 100. In addition, the terminal may perform synchronization according to the received state information and control command.

The terminal will now be described in detail with reference to FIG. 2.

Figure 2:
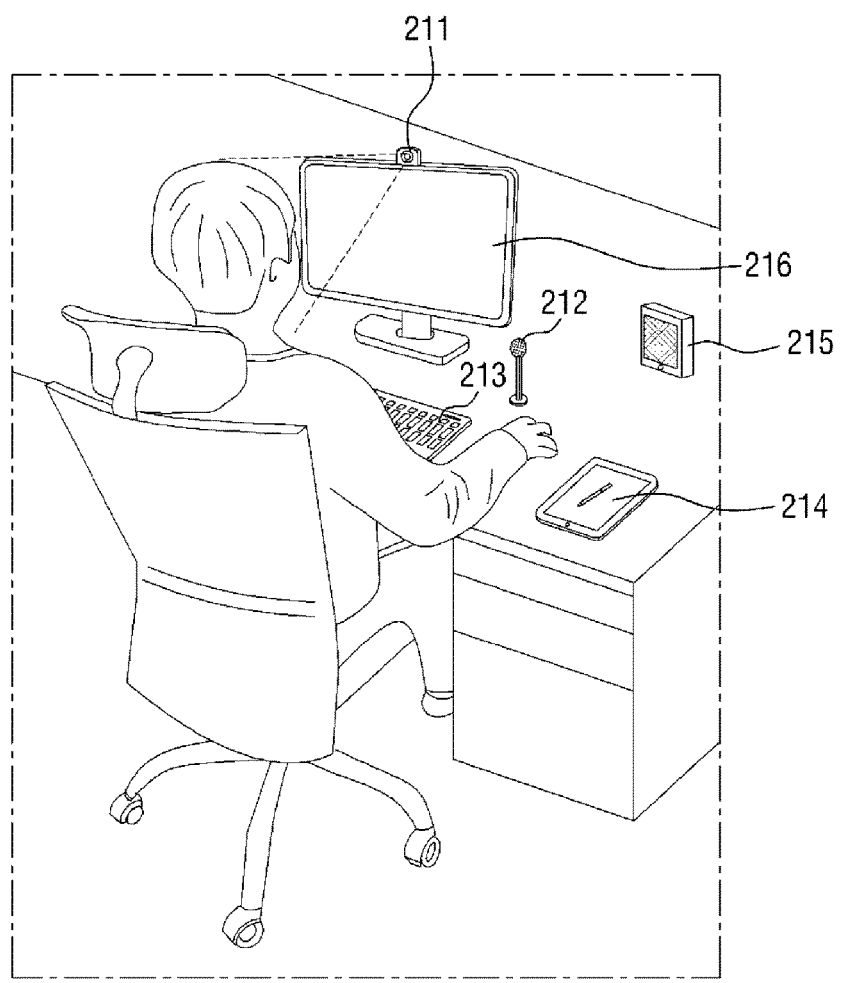
FIG. 2 illustrates a terminal for synchronizing state information according to an embodiment.

FIG. 2 illustrates a terminal for synchronizing state information according to an embodiment. For ease of description, the first terminal 210 illustrated in FIG. 1 will be described among the state information synchronization terminals. The description of the first terminal 210 is also commonly applied to a plurality of terminals included in the state information synchronization system. The first terminal 210 will be abbreviated as the terminal 210.

Referring to FIG. 2, the terminal 210 may include one or more input devices and one or more output devices. As examples of the input devices, a camera 211 for collecting image information for a real-time conference, a microphone 212 for collecting voice information, a keyboard 213 for inputting text, and a writing device 214 for inputting handwritten information are illustrated in FIG. 2. In addition, as examples of the output devices, a speaker 215 for outputting audio information of other participants and a monitor 216 for outputting conference images and contents are illustrated.

The terminal 210 may generate state information and transmit the state information to the state information synchronization apparatus 100. Here, the state information may include state information of at least one of the input devices and the output devices. For example, the state information may include information about the operating state of each input device and each output device, such as an on/off state of the microphone 212, information indicating that the voice of a user of the terminal 210 is being collected through the microphone 212, and information indicating that image information photographed by the camera 211 is being transmitted. The state information may also include a control command for controlling the terminals included in the system.

In addition, the terminal 210 may receive state information, which is a synchronization target, from the state information synchronization apparatus 100 and control at least one of the input devices and the output devices based on the received state information. Here, the state information received by the terminal 210 as synchronization target information can be different from the state information generated by the terminal 210. That is, although the terminal 210 transmitted state information A as desired synchronization target information, state information received from the state information synchronization apparatus 100 as synchronization target information may be state information B. In this case, state information with which the terminal 210 will be synchronized may be determined based on synchronization identification information set in the state information.

This will be described in detail later with reference to FIGS. 4 and 5.

Figure 3:
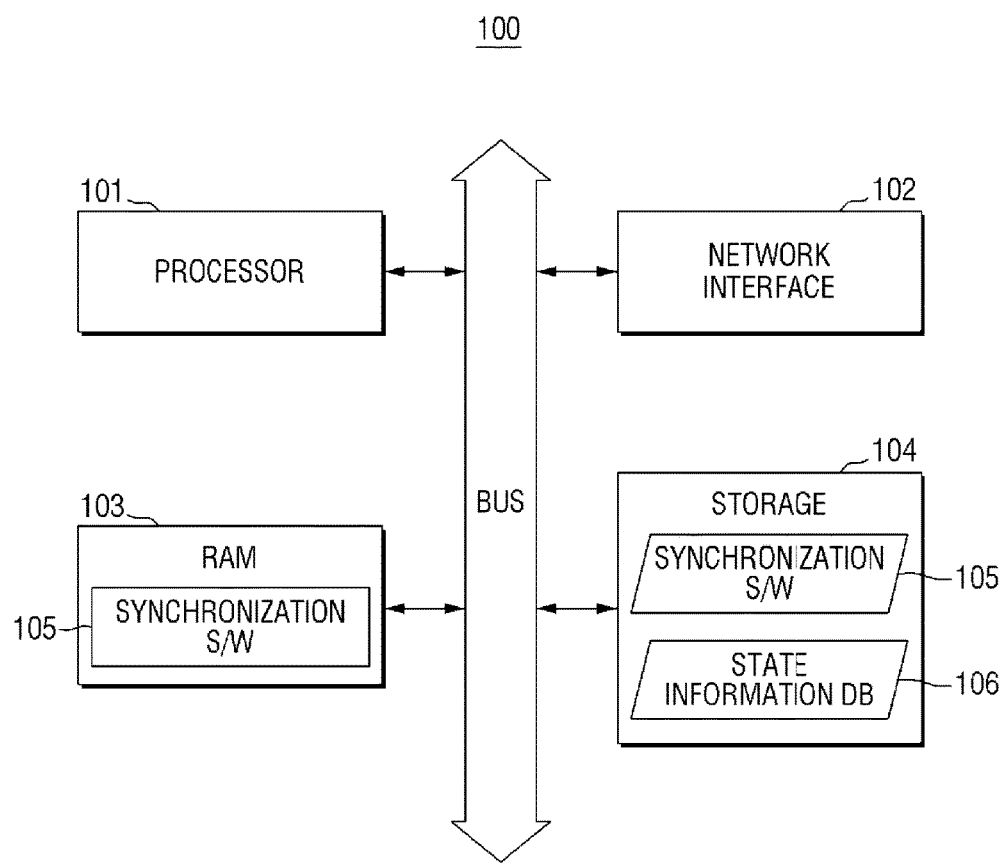
FIG. 3 is a block diagram of an apparatus for synchronizing state information according to an embodiment.

FIG. 3 is a block diagram of an apparatus 100 for synchronizing state information according to an embodiment. The structure and operation of the state information synchronization apparatus 100 will hereinafter be described in detail with reference to FIG. 3. For ease of description, the state information synchronization apparatus 100 will be referred to as a synchronization apparatus 100.

Referring to FIG. 3, the synchronization apparatus 100 includes one or more processors 101, a network interface 102 which communicates with a plurality of terminals, a memory 103 which loads a computer program to be executed by the processors 101, and a storage 104 which stores computer programs.

The processors 101 control the overall operation of each component of the synchronization apparatus 100. The processors 101 may include a central processing unit (CPU), a micro-processor unit (MPU), a micro-controller unit (MCU), or any forth of processor well known in the art to which the inventive concept pertains. In addition, the processors 101 may perform an operation on at least one application or program for executing a method according to embodiments. The synchronization apparatus 100 may include one or more processors.

The network interface 102 supports wired and wireless Internet communication of the synchronization apparatus 100. In addition, the network interface 102 may support various communication methods as well as Internet communication. To this end, the network interface 102 may include various communication modules well known in the art to which the inventive concept pertains.

The network interface 102 may transmit data to or receive data from the terminals 210 through 240 illustrated in FIG. 1 through a network. In particular, the network interface 102 may receive state information and contents for a real-time conference from each of the terminals 210 through 240. In addition, the network interface 102 may transmit or receive a control command related to the operation of the input devices and/or the output devices constituting each of the terminals 210 through 240.

The memory 103 stores various data, commands and/or information. The memory 103 may load one or more programs 105 from the storage 104 to execute a synchronization method according to embodiments. In FIG. 3, a random access memory (RAM) is illustrated as an example of the memory 103.

The storage 104 may non-temporarily store the programs 105 and state information 106. In FIG. 3, synchronization software 105 is illustrated as an example of the programs 105.

The storage 104 may include a nonvolatile memory such as a read only memory (ROM), an erasable programmable ROM (EPROM), an electrically erasable programmable ROM (EEPROM) or a flash memory, a hard disk, a removable disk, or any form of computer-readable readable recording medium well known in the art to which the inventive concept pertains.

The synchronization software 105 allows the synchronization apparatus 100 to determine a synchronization target by setting synchronization identification information in state information according to an embodiment. The synchronization software 105 also allows the synchronization apparatus 100 to determine state reservation information and generate a synchronization schedule according to an embodiment.

Figure 4:
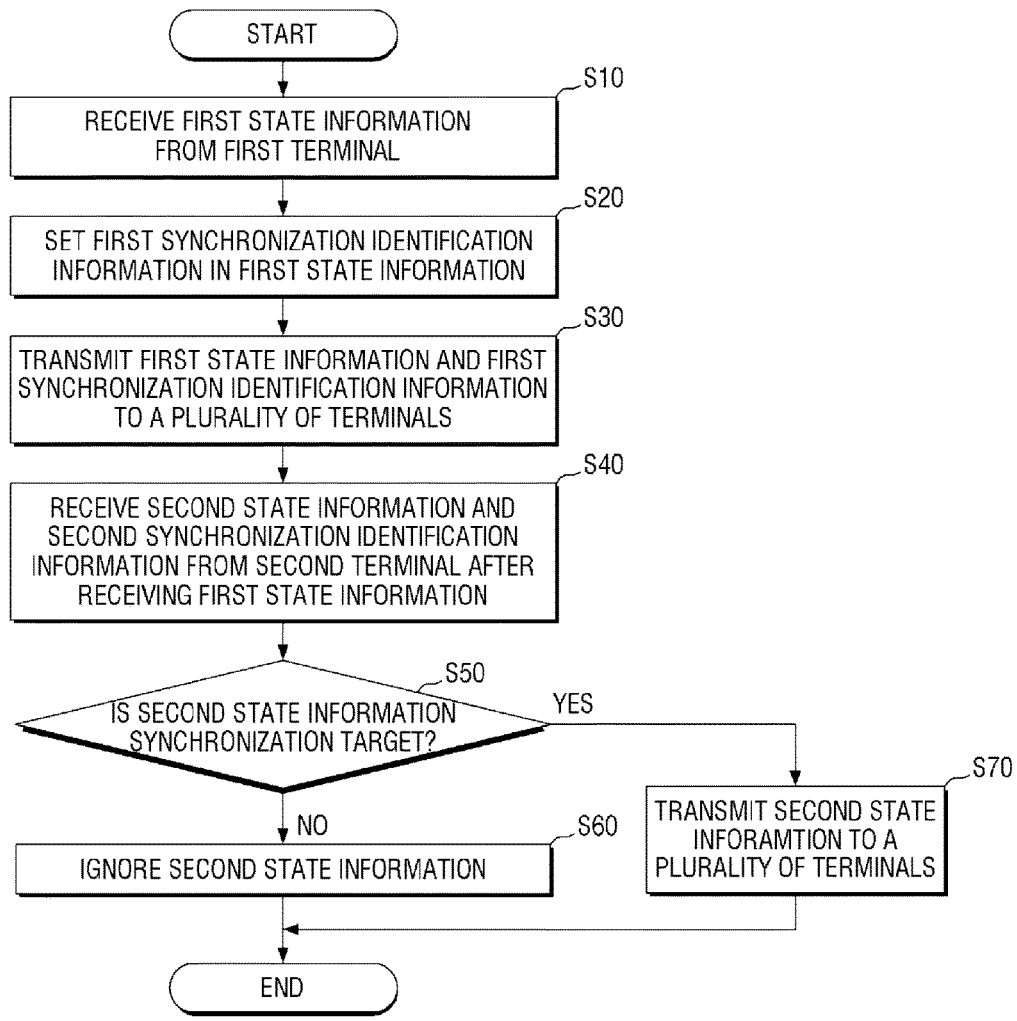
FIG. 4 is a flowchart illustrating a method of synchronizing state information according to an embodiment.

FIG. 4 is a flowchart illustrating a method of synchronizing state information according to an embodiment. The synchronization method performed by the synchronization apparatus 100 will hereinafter be described with reference to FIG. 4.

Each of the following operations is performed by the synchronization apparatus 100. In particular, each of the following operations is performed as the processors 101 perform an operation according to the synchronization software 105.

Referring to FIG. 4, the synchronization apparatus 100 may receive first state information from a first terminal 210 among a plurality of terminals (operation S10). Here, the first state information may be presence information of the first terminal 210 received from the first terminal 210 or may be operating state information of an input device and an output device of the first terminal 210. In particular, the first state information is state information received before second state information and third state information, which will be described later, among state information received by the synchronization apparatus 100.

Prior to operation S10, the terminals may create a session for a real-time conference and register their input and output devices with the synchronization apparatus 100. Each of the terminals may transmit the first state information about at least one of its input and output devices to the synchronization apparatus 100.

The synchronization apparatus 100 may set first synchronization identification information in the received first state information (operation S20). Here, synchronization identification information is unique information used to identify state information which is a synchronization target and may be timestamp information of the state information. In this case, after receiving the state information, the synchronization apparatus 100 may attach the timestamp information to the received state information and then transmit the state information to each terminal for synchronization.

Alternatively, the synchronization identification information may be sequence information determined according to the order in which the synchronization apparatus 100 transmits state information. The synchronization apparatus 100 and the terminals may determine whether received state information is a synchronization target by referring to the synchronization identification information. Hereinafter, a case where the synchronization identification information is the timestamp information will be described. However, this is merely for ease of description, and embodiments of the inventive concept are not limited to this case.

The synchronization apparatus 100 may transmit the first state information and the first synchronization identification information set in the first state information to the terminals (operation S30). For example, the synchronization apparatus 100 may set '1' as synchronization identification information in received state information A. In this case, the synchronization apparatus 100 may transmit the state information A having the synchronization identification information set to '1'. The synchronization apparatus 100 may transmit state information to all terminals in the system or may transmit only to terminals corresponding to a control command or the state information.

When receiving the first state information, the first terminal 210 may control at least one of its input and output devices based on the first state information. That is, in the above example, the first terminal 210 may receive the state information A and timestamp information of 1. Here, the first terminal 210 may synchronize its state based on the state information A. When the state information A is a control command for the input device or the output device, the first terminal 210 may control the input device or the output device based on the received state information A.

In addition, the first terminal 210 can transmit the second state information to the state information synchronization apparatus 100 together with the first synchronization identification information.

Accordingly, the synchronization apparatus 100 may receive state information B, which is the second state information, from the first terminal 210 or another terminal in the system. Here, the first terminal 210 or another terminal may transmit the state information B together with last received synchronization identification information. In the above example, the synchronization apparatus 100 may receive the state information B and the timestamp of 1 which is synchronization identification information.

The synchronization apparatus 100 may determine whether received state information is a synchronization target by comparing received synchronization identification information with last synchronization identification information that it transmitted. In the above example, the last transmitted synchronization identification information is the timestamp of 1, and the synchronization identification information received together with the state information B is also the timestamp of 1. That is, the first synchronization identification information set in the state information received from the first terminal 210 is the same as the identification information set in the state information received from another terminal.

In this case, the synchronization apparatus 100 may determine the state information B to be a synchronization target. The synchronization apparatus 100 may transmit the state inform B determined to be a synchronization target to the terminals in the system. Here, the synchronization apparatus 100 may set a timestamp of 2 as synchronization identification information for the state information B by updating the synchronization identification information and may transmit the state information B to the terminals in the system together with the set synchronization identification information. Accordingly, when the first terminal 210 receives the state information B which is the second state information, it may control at least one of its input and output devices based on the received state information B.

On the other hand, after receiving the first state information, the synchronization apparatus 100 can receive the second state information and second synchronization identification information set in the second state information from a second terminal among the terminals (operation S40). In the above example, the synchronization apparatus 100 may receive the state information B from the first terminal 210 or another terminal in the system, and the state information B may have the timestamp of 2 which is the second synchronization identification information, instead of the timestamp of 1 which is the first synchronization identification information.

The synchronization apparatus 100 may determine whether the received second state information is a synchronization target based on the received first synchronization identification information and the received second synchronization identification information (operation S50). That is, since the timestamp of 1 and the timestamp of 2 are different from each other as a result of comparing the first synchronization identification information and the second synchronization identification information, the synchronization apparatus 100 may determine that the state information B which is the second state information is not a synchronization target.

If the second state information is not a synchronization target, the synchronization apparatus 100 may not transmit the received second state information to the terminals in the system (operation S60). On the other hand, if the second state information is a synchronization target, the synchronization apparatus 100 may transmit the second state information (operation S70).

Figure 5:
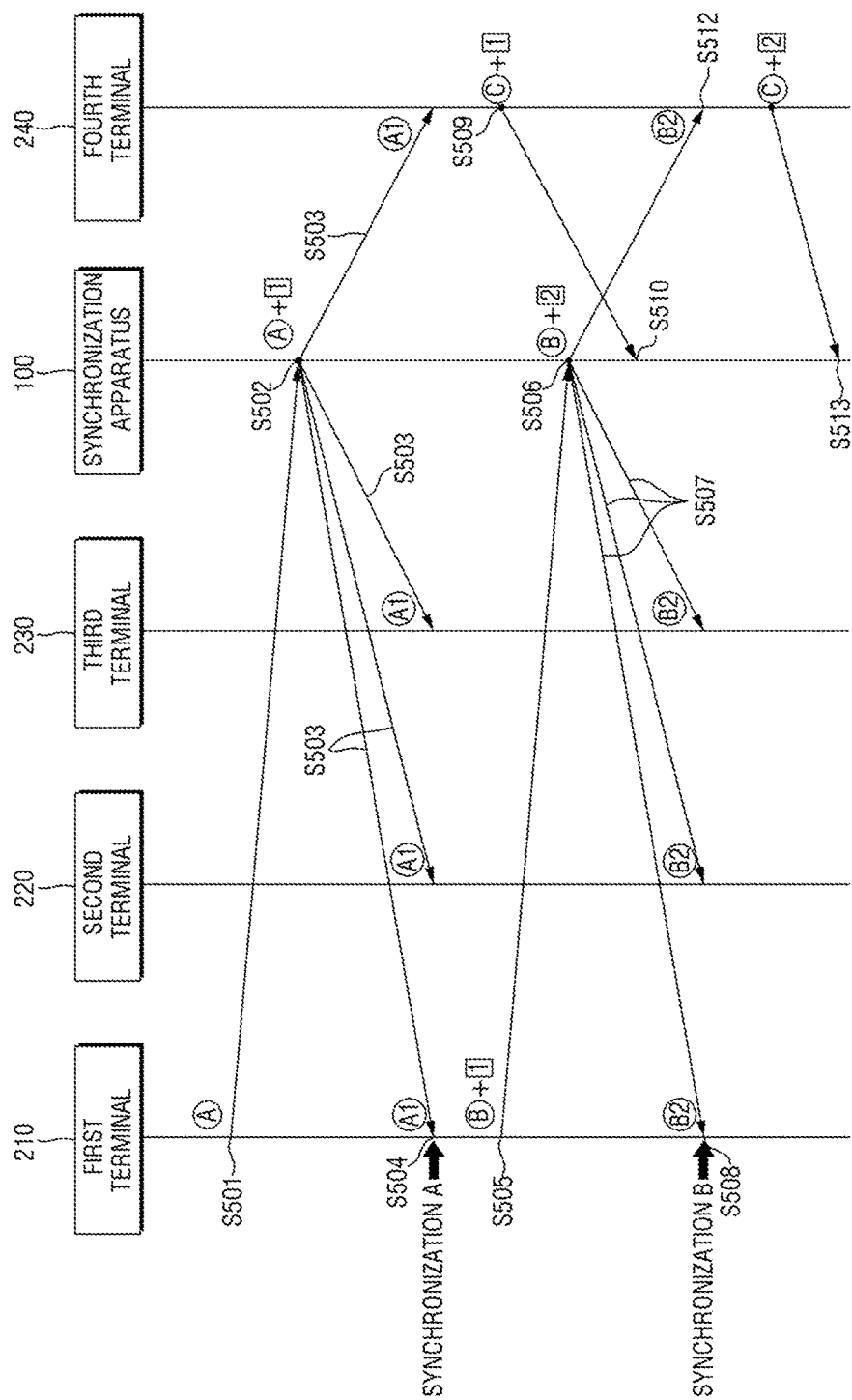
FIG. 5 illustrates the flow of state information and a synchronization target according to an embodiment.

FIG. 5 illustrates the flow of state information and a synchronization target according to an embodiment. The synchronization method described above with reference to FIG. 4 will be described once again with reference to FIG. 5.

Referring to FIG. 5, a first terminal 210 may transmit state information A to a synchronization apparatus 100. As described above, the state information A may be presence information of the first terminal 210 or information about the operating state of an input device and/or an output device of the first terminal 210. For example, the state information A may be information indicating that the voice of a participant is being collected with a microphone of the first terminal 210 turned on.

The synchronization apparatus 100 may receive the state information A and set a timestamp of 1 in the received state information A (operation S502). In addition, the synchronization apparatus 100 may transmit the state information A and the timestamp of 1 to terminals 210 through 240 in a synchronization system (operation S503). The terminals 210 through 240 in the synchronization system may be synchronized with state A based on the received state information A (operation S504).

Next, the first terminal 210 may generate state information B, attach the last received timestamp of 1 to the state information B, and transmit the state information B having the timestamp of 1 to the synchronization apparatus 100 (operation S505). Although a case where the first terminal 210 transmits the state information B is illustrated in FIG. 5, this is merely an example, and other terminals 220 through 240 in the synchronization system can also transmit the state information B, that is, state information different from the state information A with which the terminals 210 through 240 have been synchronized, to the synchronization apparatus 100 in the same way as the first terminal 210.

In this case, the synchronization apparatus 100 may receive the state information B and the timestamp of 1. In addition, the synchronization apparatus 100 may determine the state information B to be a synchronization target because the timestamp of 1 that it transmitted previously is the same as the received timestamp of 1. Here, the synchronization apparatus 100 may set a timestamp of 2 different from the timestamp of 1 in the state information B (operation S506).

Next, the synchronization apparatus 100 may transmit both the state information B and the timestamp of 2 to the terminals 210 through 230 (operation S507). The terminals 210 through 230 which receive the state information B may detect that the timestamp has been updated and synchronize their states based on the state information B (operation S508).

Here, the state information B and the timestamp of 2 can also be transmitted to the fourth terminal 240 as in operation S507 (operation S512). In particular, the fourth terminal 240 may transmit state information C to the synchronization apparatus 100 before operations S507 and S512 (operation S509). In this case, the fourth terminal 240 may attach the last received timestamp of 1 to the state information C and then transmit the state information C having the timestamp of 1 to the synchronization apparatus 100 (operation S509).

The synchronization apparatus 100 may compare the timestamp of 2 that it transmitted last with the timestamp of 1 received from the fourth terminal 240 and determine that the state information C is not a synchronization target because the timestamp of 1 is synchronization identification information already determined to be a synchronization target before the timestamp of 2 is transmitted.

Accordingly, the synchronization apparatus 100 may ignore the received state information C and may not transmit the state information C to the terminals. Therefore, after transmitting the state information C and the timestamp of 1, the fourth terminal 240 receives the state information B and the timestamp of 2 from the synchronization apparatus 100, but not the state information C and the timestamp of 2. The fourth terminal 240 may select a synchronization target from the state information C and the state information B by comparing the transmitted timestamp of 1 with the received timestamp of 2.

Therefore, although the fourth terminal 240 generated and transmitted the state information C, it is synchronized with the state information B. After being synchronized with the state information B, if the fourth terminal 240 transmits the state information C together with the timestamp of 2, the synchronization apparatus 100 may determine the state information C to be a synchronization target (operation S513).

Meanwhile, when transmitting state information to each terminal in operation S30 of FIG. 4 or operations S503, S507 and S512 of FIG. 5, the synchronization apparatus 100 may also transmit information about a period of time during which the synchronized state of each terminal will be maintained. That is, the synchronization apparatus 100 may determine a period of time during which each terminal will be maintained in a specific state based on received state information and transmit information about the determined period of time.

In this case, while a terminal is maintained in a first state after being synchronized with the first state according to first state information, another terminal can transmit second state information. However, even if the synchronization apparatus 100 receives the second state information, it may not transmit the second state information to a plurality of terminals in the system for a period of time during which the terminal is maintained in the first state. Instead, the synchronization apparatus 100 may manage the second state information as reservation information.

Alternatively, according to an embodiment, even if the synchronization apparatus 100 transmits the second state information and the terminals in the system receive the second state information, the terminals may not perform synchronization based on the second state information during the above period of time. In this case, the terminals may synchronize their states based on the second state information after the period of time.

In this way, the synchronization apparatus 100 can provide an orderly real-time conference service by allowing terminals of participants attending a real-time conference to be maintained in a specific state for a predetermined period of time. Hereinafter, a method of determining the second state information to be state reservation information when the second state information is received while the state according to the first state information is being maintained will be described in detail with reference to FIG. 6.

Figure 6:
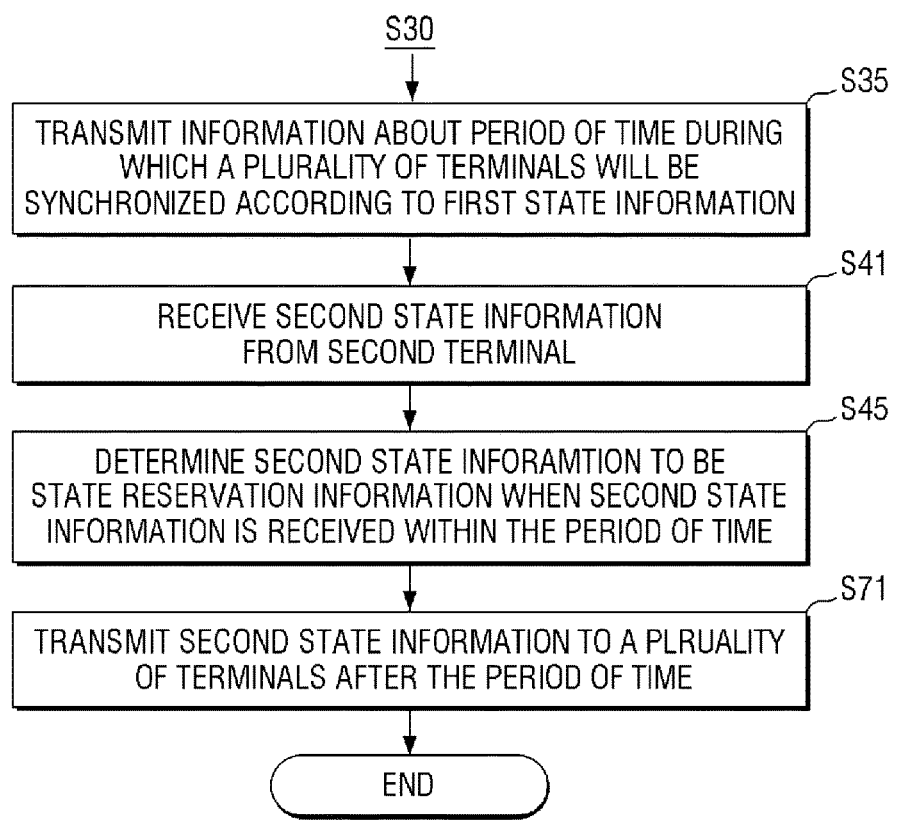
FIG. 6 is a flowchart illustrating a method of transmitting state reservation information according to an embodiment.

FIG. 6 is a flowchart illustrating a method of transmitting state reservation information according to an embodiment.

Referring to FIG. 6, in operation S30, the synchronization apparatus 100 may transmit information about a period of time during which the terminals will be synchronized according to the first state information (operation S35). A case where first time information is matched with the first state information will now be described as an example. After receiving the first state information, the synchronization apparatus 100 may match the first time information with the first state information based on the first state information and information about the terminal that transmitted the first state information. For example, when the first state information of the first terminal 210 is a floor request, the synchronization apparatus 100 may receive the floor request, determine whether the first terminal 210 is a terminal of a participant having the right to speak, determine a speaking time according to the rating of the right to speak, and transmit the floor request having the determined speaking time as a synchronization target. Alternatively, when the first terminal 210 transmits the first state information to the synchronization apparatus 100, it may determine the speaking time and transmit the floor request together with the determined speaking time.

When each terminal is synchronized according to the synchronization target received, the microphone of the first terminal 210 is kept turned on during the determined speaking time, and the microphones of the other terminals are turned off during the determined speaking time of the participant having the first terminal 210.

Here, the synchronization apparatus 100 may receive second state information from the second terminal 220 (operation S41). If the second state information is received while the participant having the first terminal 210 is speaking for a predetermined period of time after each of the terminals is synchronized with the first state, the synchronization apparatus 100 may determine the second state information to be state reservation information (operation S45).

After the predetermined period of time, the synchronization apparatus 100 may transmit the second state information determined to be the state reservation information to the terminals (operation S71).

Here, according to the transmitted second state information, the synchronization apparatus 100 may also transmit to at least one of the terminals in the system a control command for at least one of the input device and the output device included in the at least one of the terminals.

In operation S45, the synchronization apparatus 100 may determine whether there exists third state information received from at least one of the terminals. The third state information may be state information received before or after the second state information.

When determining that there exists the third state information, the synchronization apparatus 100 may determine the reservation order of the second state information and the third state information based on details of state information received in advance from the terminals.

FIG. 7 illustrates a reservation order list 700 which is referred to in some embodiments.

In FIG. 7, the list 700 in which determined reservation orders are arranged in order is illustrated. The synchronization apparatus 100 may generate the list 700.

Referring to reservation order 1, a floor request from a first terminal 210 with a speaking time of 10 minutes was determined as state reservation information. As a control command issued according to the floor request, a command for turning off microphones of a second terminal 220 and a third terminal 230 and turning on a microphone of a fourth terminal 240 is illustrated. Referring to reservation order 2, a request from the first terminal 210 to transmit handwritten contents for 10 minutes was determined as state reservation information. As a control command issued according to the request, a command for controlling monitors of the other terminals is illustrated.

Next, referring to reservation order 3, a request from the third terminal 230 to transmit images for 5 minutes was determined as state reservation information, and a command for turning off the microphones of the other terminals and controlling the monitors of all terminals is illustrated as a control command issued according to the request. Referring to reservation order 4, a request from the second terminal 220 to turn off the microphone of the first terminal 210 for 10 minutes was determined as state reservation information. Referring to reservation order 5, a request to turn on the microphone is illustrated as reservation information.

Referring to FIG. 7, the synchronization apparatus 100 can identify details of state information received in advance from a plurality of terminals. That is, the synchronization apparatus 100 can identify the accumulated amount of state reservation information and information about sources that transmitted the state reservation information, together with the list 700. Based on this, the synchronization apparatus 100 can determine state reservation information.

FIG. 8 illustrates a modified reservation order list which is referred to in some embodiments.

In FIG. 7, the state reservation information of reservation order 1 matches that of reservation order 4. That is, since the first terminal 210 and the fourth terminal 240 have the same state reservation information and the same state holding time, the synchronization apparatus 100 may combine the state reservation information of the first terminal 210 and the state reservation information of the fourth terminal 240 as shown in a list 800 of FIG. 8.

Referring to FIG. 8, in this case, after a period of time during which the first state information is maintained, if synchronization is performed based on the state reservation information of reservation order 1, only the microphones of the first and fourth terminals 210 and 240 are turned on, and the microphones of other terminals are turned off for 10 minutes. For example, this may be a case where a one-to-one discussion is conducted between a user of the first terminal 210 and a user of the fourth terminal 240.

Next, the synchronization apparatus 100 may recognize that a user of the third terminal 230 is a VIP and keep the third terminal 230 at reservation order 2. In the above example, after the one-to-one discussion between the users of the fourth terminal 240 and the first terminal 210 is conducted for 10 minutes, the synchronization apparatus 100 may receive images collected by the camera of the third terminal 230 and transmit the images to other terminals according to the state reservation information. Here, the synchronization apparatus 100 may restrict the use of monitors of other terminals. For example, this may be a case where a VIP is making a five-minute speech.

The synchronization apparatus 100 may then turn off the microphone of the first terminal 210 according to the state reservation information of the second terminal 220.

The synchronization apparatus 100 may change the reservation order of the state reservation information of a participant having a large cumulative number of reservations to a later order.

In addition, the synchronization apparatus 100 may receive a reservation change request after determining a reservation order. In this case, based on the received reservation change request, the synchronization apparatus 100 may re-determine the reservation order.

Figure 9:
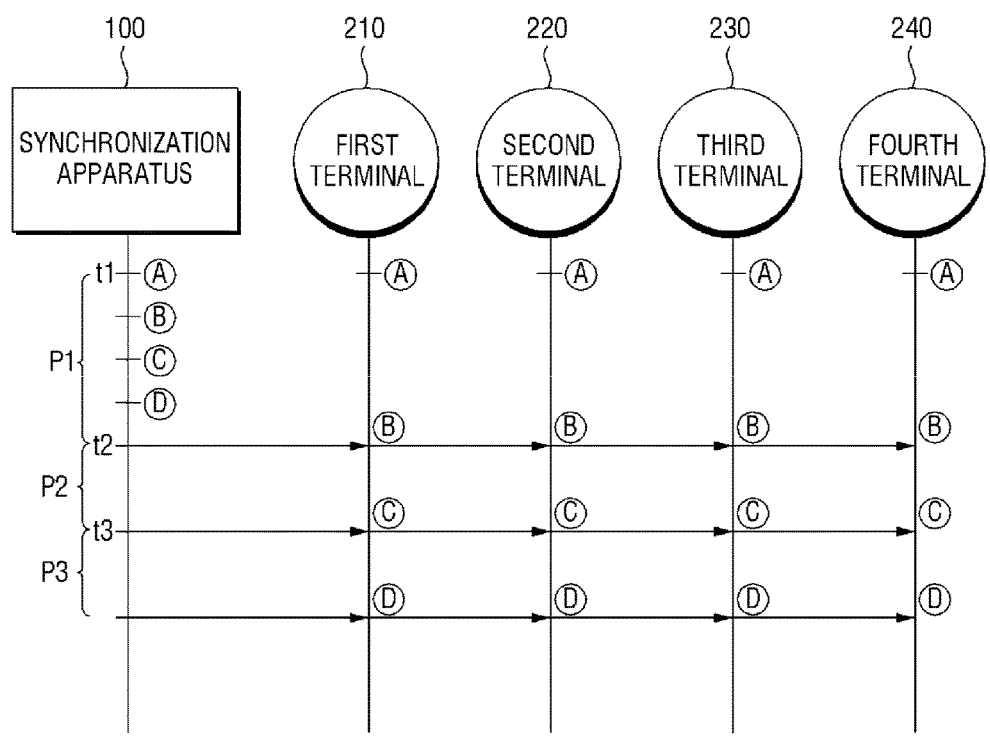
FIG. 9 illustrates a sequential process of synchronizing a plurality of terminals according to a reservation order, which is referred to in some embodiments.

FIG. 9 illustrates a sequential process of synchronizing a plurality of terminals according to a reservation order, which is referred to in some embodiments.

Based on the reservation order determined in FIGS. 7 and 8, the synchronization apparatus 100 may sequentially transmit second state information and third state information to a plurality of terminals after a period of time during which synchronized states of the terminals according to the first state information are maintained.

Referring to FIG. 9, a plurality of terminals 210 through 240 are synchronized with state information A at t1 and maintained in the state information A for P1. If state reservation information B, state reservation information C and state reservation information D are received during P1 and the reservation order of the state reservation information B, the state reservation information C and the state reservation information D is determined, the synchronization apparatus 100 transmits state information B corresponding to the state reservation information B to the terminals 210 through 240 at t2 after the elapse of P1. Accordingly, the terminals 210 through 240 are synchronized based on the state information B. In addition, after the synchronized states of the terminals 210 through 240 according to the state information B are maintained for P2, state information C corresponding to the state reservation information C is sequentially transmitted to the terminals 210 through 240. Then, after the synchronized states of the terminals 210 through 240 according to the state information C are maintained for P3, state information D corresponding to the state reservation information D is transmitted to the terminals 210 through 240. Accordingly, the terminals 210 through 240 are synchronized with the state information D.

In order to save network resources, the synchronization apparatus 100 may generate a synchronization schedule based on the determined reservation order and transmit schedule information to a plurality of terminals only once. In this case, each terminal may perform synchronization by itself whenever the state holding time matched with each piece of state information elapses according to a predetermined schedule.

Figure 10:
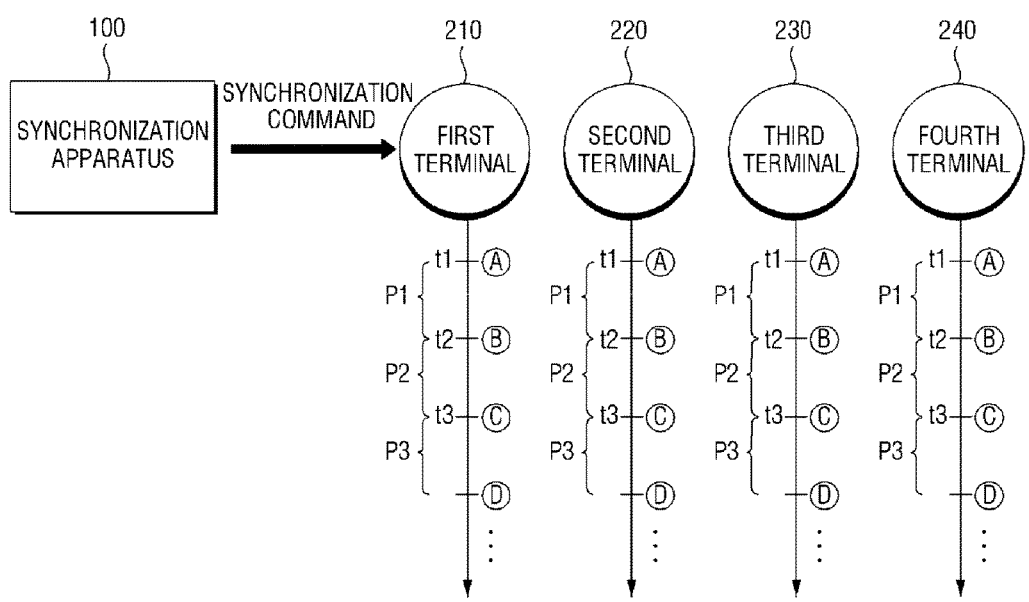
FIG. 10 illustrates a process of synchronizing a plurality of terminals according to a synchronization schedule, which is referred to in some embodiments.

FIG. 10 illustrates a process of synchronizing a plurality of terminals according to a synchronization schedule, which is referred to in some embodiments.

Referring to FIG. 10, the synchronization apparatus 100 may determine a reservation order based on received state reservation information and generate schedule information based on the determined reservation order. The synchronization apparatus 100 may transmit a synchronization command to a plurality of terminals 210 through 240 together with the schedule information.

Each of the terminals 210 through 240 which receive the synchronization schedule information and the synchronization command may automatically perform synchronization according to the received synchronization schedule in consideration of a predetermined synchronization time and a predetermined synchronization holding time.

The methods according to the embodiments described above with reference to the attached drawings can be performed by the execution of a computer program implemented as computer-readable code. The computer program may be transmitted from a first computing device to a second computing device through a network, such as the Internet, to be installed in the second computing device and thus can be used in the second computing device. Examples of the first computing device and the second computing device include fixed computing devices such as a server and a desktop PC and mobile computing devices such as a notebook computer, a smartphone and a tablet PC.

According to the inventive concept, it is possible to minimize the exchange of unnecessary state information in a real-time conference environment. Specifically, according to the inventive concept, it is possible to provide a method of determining whether state information is a synchronization target based on synchronization identification information set in the state information.

In addition, according to the inventive concept, it is possible to efficiently conduct a real-time conference by controlling terminal functions of participants based on state information.

According to the inventive concept, it is possible to provide a method and apparatus for minimizing the amount of state information transmitted by generating a synchronization schedule composed of a plurality of pieces of state information and transmitting the generated synchronization schedule.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of synchronizing state information of a plurality of terminals, the method comprising:
receiving first state information from a first terminal among the plurality of terminals;
assigning first synchronization identification information to the received first state information, the first synchronization identification information being information to identify whether first state information is a synchronization target;
transmitting the first state information and the first synchronization identification information to the plurality of terminals;
receiving second state information and second synchronization identification information, assigned to the second state information, from a second terminal among the plurality of terminals, the second synchronization identification information being information to identify whether the second state information is a synchronization target;
determining whether the received second state information is a synchronization target based on whether the received first synchronization identification information matches the received second synchronization identification information;
withholding transmission of the received second state information to the plurality of terminals in response to determining that the received second state information is not a synchronization target; and
updating the second synchronization identification information to third synchronization identification information in response to determining that the received second state information is a synchronization target and transmitting the received second state information and the third synchronization identification information to the plurality of terminals.

2. The method of claim 1, wherein the transmitting the first state information and the first synchronization identification information comprises transmitting a control command, for at least one of an input device and an output device included in at least one of the plurality of terminals, to the at least one of the plurality of terminals.

3. The method of claim 1, wherein the receiving the first state information comprises receiving from the first terminal a control command for at least one of an input device and an output device included in the plurality of terminals other than the first terminal, and
wherein the transmitting the first state information and the first synchronization identification information comprises transmitting the control command to the plurality of terminals other than the first terminal.

4. The method of claim 1, wherein the transmitting the first state information and the first synchronization identification information comprises:
transmitting information about a period of time during which state information of the plurality of terminals synchronized according to the first state information is maintained;
receiving third state information from the second terminal;
determining the third state information to be state reservation information in response to the third state information being received within the period of time; and transmitting the third state information determined to be the state reservation information to the plurality of terminals after the period of time elapses.

5. The method of claim 4, wherein the determining the third state information to be the state reservation information comprises:
determining whether there exists fourth state information received from at least one of the plurality of terminals;
determining a reservation order of the third state information and the fourth state information based on details of state information received in advance from the plurality of terminals in response to determining that there exists the fourth state information; and
sequentially transmitting the third state information and the fourth state information to the plurality of terminals according to the determined reservation order after the period of time elapses.

6. The method of claim 1, wherein the first synchronization information is timestamp information of the first state information and the second synchronization information is timestamp information of the second state information.

7. The method of claim 1, wherein the first synchronization information is sequence information of the first state information and the second synchronization information is sequence information of the second state information.

8. The method of claim 1, wherein the plurality of terminals are terminals of participants of real-time conference service, and wherein the first synchronization information and the second synchronization information is state information of the participants.

9. An apparatus for synchronizing state information of a plurality of terminals, the apparatus comprising:
a hardware processor;
a network interface configured to communicate with the plurality of terminals;
a storage configured to store computer program; and
a memory configured to load the computer program to be executed by the hardware processor,
wherein the computer program comprises instructions to perform a method comprising:
receiving first state information from a first terminal among the plurality of terminals;
assigning first synchronization identification information to the received first state information, the first synchronization identification information being information to identify whether first state information is a synchronization target;
transmitting the first state information and the first synchronization identification information to the plurality of terminals;
receiving second state information and second synchronization identification information, assigned to the second state information, from a second terminal among the plurality of terminals, the second synchronization identification information being information to identify whether the second state information is a synchronization target;
determining whether the received second state information is a synchronization target based on whether the received first synchronization identification information matches the received second synchronization identification information;
withholding transmission of the received second state information to the plurality of terminals in response to determining that the received second state information is not a synchronization target; and
updating the second synchronization identification information to third synchronization identification information in response to determining that the received second state information is a synchronization target and transmitting the received second state information and the third synchronization identification information to the plurality of terminal.

10. The apparatus of claim 9, wherein the withholding the transmission of the received second state information to the plurality of terminals comprises deleting the received second state information.

11. A method of synchronizing state information by a terminal including an input device and an output device, the method comprising:
transmitting first state information to an apparatus for synchronizing state information among a plurality of terminals;
receiving the first state information and first synchronization identification information assigned to the first state information from the apparatus, the first synchronization identification information being unique information to identify whether the first state information is a synchronization target;
synchronizing state information of the terminal based on the first state information in response to determining that the first state information is a synchronization target the first synchronization identification information and controlling at least one of the input device and the output device based on the first state information;
transmitting second state information and the first synchronization identification information to the apparatus to request synchronization of the second state information;
receiving the second state information and second synchronization identification information assigned to the second state information from the apparatus, the second synchronization identification information being unique information to identify the second state information which is a synchronization target; and
synchronizing state information of the terminal based on the second state information in response to determining that the second synchronization identification information is updated information from the first synchronization identification information and controlling at least one of the input device and the output device based on the second state information.

12. The method of claim 11, wherein the transmitting the second state information and the first synchronization identification information to the apparatus comprises:
receiving third state information and third synchronization identification information after transmitting the second state information and the first synchronization identification information;
selecting a synchronization target from the second state information and the third state information based on whether the first synchronization identification information matches the third synchronization identification information; and
controlling at least one of the input device and the output device based on the selected synchronization target.

13. The method of claim 11, wherein the first synchronization information is timestamp information of the first state information and the second synchronization information is timestamp information of the second state information.

14. The method of claim 11, wherein the first synchronization information is sequence information of the first state information and the second synchronization information is sequence information of the second state information.

15. The method of claim 11, wherein the terminal is a terminal of a participant of real-time conference service, and wherein the first synchronization information and the second synchronization information is state information of the participant.

\* \* \* \* \*